United States Patent [19]
Kishihara et al.

[11] Patent Number: 5,958,116
[45] Date of Patent: Sep. 28, 1999

[54] ANTIFOULING COATING COMPOSITION

[75] Inventors: Masato Kishihara, Odawara; Akira Saito, Fujisawa; Hiroshi Yamashita, Hiratsuka; Toshimitsu Muramatsu, Yokosuka; Yoichi Yonehara, Chigasaki, all of Japan

[73] Assignee: Kansai Paint Co., Ltd., Japan

[21] Appl. No.: 09/039,217

[22] Filed: Mar. 14, 1998

[30] Foreign Application Priority Data

Mar. 14, 1997 [JP] Japan ..................................... 9-060290

[51] Int. Cl.$^6$ ..................................................... A01N 55/10
[52] U.S. Cl. ................................... 106/15.05; 106/18.32; 424/78.09; 424/724; 427/387; 428/447; 428/450; 514/63; 525/477; 528/33
[58] Field of Search ............................. 106/15.05, 18.32; 525/477; 528/33; 427/387; 428/447, 450; 424/78.09, 724; 514/63

[56] References Cited

U.S. PATENT DOCUMENTS

| | | | |
|---|---|---|---|
| 4,025,693 | 5/1977 | Milne | 428/447 |
| 4,500,447 | 2/1985 | Kobayashi et al. | 252/511 |
| 5,099,053 | 3/1992 | Takaoka et al. | 556/448 |
| 5,218,059 | 6/1993 | Kishihara et al. | 525/477 |

*Primary Examiner*—Anthony Green
*Attorney, Agent, or Firm*—Huntley & Associates

[57] ABSTRACT

A non-toxic antifouling coating composition comprising (a) about from 5 to 95 parts by weight as the resin solid content of a room temperature-curable silicone rubber having a number-average molecular weight of about from 20,000 to 100,000, (b) about from 5 to 95 parts by weight as the resin solid content of a room temperature-curable silicone rubber having a number-average molecular weight of about from 500 to 20,000, (c) silicone oil in an amount of about from 20 to 200 parts by weight per 100 parts by weight of the total solids of the rubbers (a) and (b), and (d) hydrophobic fumed silica in an amount of about from 5 to 30 parts by weight per 100 parts by weight of the total solids of the rubbers (a) and (b), provides a non-toxic antifouling coating composition which is capable for forming a coating film having highly improved antifouling properties and antifouling durability for a long period of time.

6 Claims, No Drawings

ANTIFOULING COATING COMPOSITION

BACKGROUND OF THE INVENTION

1. Field of the Invention

The present invention relates to non-toxic antifouling coating compositions free from toxic materials, and more particularly to coating compositions which can be applied to underwater structures such as ships, port facilities, buoys, pipelines, bridges, water conduit raceway tubes in power plants, submarine stations, submarine oil field excavation facilities, cultivating fishing nets, stationary fishing nets and the like. The compositions provide an antifouling film on the surface of the underwater structures which prevents underwater organisms from adhering and growing on the surfaces of the structures over a long period of time.

2. Description of the Prior Art

A large number of organisms such as barnacles, ascidian, serupulas, fresh- and salt-water mussels, polyzoan, green algae, sea lettuce and the like live in the waters of the sea, rivers, lakes and swamps. These plants and animals cause various types of damage to the surfaces of structures that are submerged in or splashed with these waters.

In order to prevent the underwater organisms from adhering to the underwater structures and growing thereon, antifouling coating compositions have previously been prepared incorporating toxic antifouling agents such as organotin compounds. While the use of such antifouling coating compositions could almost entirely prevent the underwater organisms from adhering to underwater structures and growing thereon, the use of the toxic antifouling agents is undesirable from the standpoints of environmental safety and hygiene.

In order to solve the above problems, various non-toxic antifouling coating compositions have previously been proposed. For example, U.S. Pat. Nos. 4,025,693 and 5,218,059 disclose non-toxic antifouling coating compositions which are prepared using a silicone rubber alone or as a mixture with a silicone oil. The use of a silicone rubber in combination with a silicone oil markedly improved antifouling properties of the coatings compared with the use of a silicone rubber alone. However, the use of the silicone rubber in combination with the silicone oil was not entirely satisfactory in antifouling durability over a long period of time. Hence, further improvement in antifouling properties and the durability of these properties has been sought.

SUMMARY OF THE INVENTION

The present invention provides a non-toxic antifouling coating composition which is capable for forming a coating film having excellent antifouling properties and antifouling durability.

Specifically, the present invention provides a non-toxic antifouling coating composition comprising:

(a) about from 5 to 95 parts by weight of rubbers (a) and (b) of a room temperature-curable silicone rubber having a number-average molecular weight of about from 20,000 to 100,000;

(b) about from 5 to 95 parts by weight of rubbers (a) and (b) of a room temperature-curable silicone rubber having a number-average molecular weight of about from 500 to 20,000 and less than that of rubber (a);

(c) at least one silicone oil in an amount of about from 20 to 200 parts by weight per 100 parts by weight of rubbers (a) and (b); and (d) hydrophobic fumed silica in an amount of about from 5 to 30 parts by weight per 100 parts by weight of rubbers (a) and (b).

DETAILED DESCRIPTION OF THE INVENTION

The present invention will be more fully understood by reference to the following description and examples. Variations and modifications of the embodiments of the invention can be substituted without departing from the principles of the invention, as will be evident to those skilled in the art.

The present invention is based on the discovery that the use of the two kinds of room temperature-curable silicone rubbers, each having a specific molecular weight, the silicone rubbers being present in a specific ratio, in combination with silicone oil and fumed silica in a specific range, can make a uniform antifouling functional layer of the silicone oil on a surface of a coated film even in a dry film thickness of more than 125 micrometers when applied in a single coat. This makes it possible to maintain antifouling properties of the coated film over a long period of time.

Room Temperature-curable Silicone Rubber (a)

The room temperature-curable silicone rubber (a) used in the present invention has a number-average molecular weight of about from 20,000 to 100,000, and can be chemically reacted and cured at a room temperature lower than 80° C. and comprises, as the major component, an organopolysiloxane having a siloxane bond. The organopolysiloxane has such a structure that a curably reactive functional group and organic group are bonded directly to Si. Examples of the curably reactive functional groups include a hydroxyl group and alkoxy groups having 1 to 5 carbon atoms. Examples of the organic group include a methyl group, an ethyl group, a vinyl group, a haloalkyl group, and a phenyl group.

A crosslinking agent can be added to the organopolysiloxane. Representative of the crosslinking agents which can be used are polyfunctional silane compounds which have a hydrolyzable group such as an acetoxy group or a ketoxime group, or a curing catalyst. Examples of the polyfunctional silane compounds include methyl-tris(methyl ethyl ketoxime)silane, vinyl-tris(methyl ethyl ketoxime)silane, tetra(methyl ethyl ketoxime)silane, methyltrimethoxysilane, ethyltriacetoxysilane, tetraethoxysilane, methyltri(N,N-dimethylamino)silane; and partially hydrolyzed compounds of the above. Examples of curing catalysts which can be used in the present invention include organo metal catalysts such as dibutyltin diacetate, dibutyltin dioctate, dibutyltin dilaurate, zinc naphthenate, cobalt naphthenate, tin octylate, cobalt octylate, zirconium naphthenate and tetrabutyl orthotitanate; and amine catalysts such as diethanolamine and triethanolamine.

The above silicone rubber (a) is cured at room temperature or by heating. The specific curing mechanism can vary widely, and can include, for example, hydrolyzation, dealcoholyzation, deacetification, dehydroxyamination and the like. The use of the organopolysiloxane having a vinyl group makes possible curing by irradiation of electron rays or ultraviolet light. If ultraviolet light is used for the irradiation, it is generally necessary to add a photosensitizer.

The above silicone rubber (a) has a number-average molecular weight of about from 20,000 to 100,000, and preferably about from 20,000 to 60,000. If the number-average molecular weight of the silicone rubber (a) is lower than about 20,000, it results in a coating film inferior in toughness, while a silicone rubber having a number-average molecular weight higher than about 100,000 causes poor application workability because of high viscosity of the coating composition.

Room Temperature-curable Silicone Rubber (b)

The room temperature-curable silicone rubber (b) used in the present invention is a low molecular weight silicone rubber having a number-average molecular weight of about from 500 to 20,000, and lower than rubber (a), and which can be chemically reacted and cured at a room temperature lower than about 80° C. and which comprises, as the major component, an organopolysiloxane having a siloxane bond. The organopolysiloxane has such a structure that a curably reactive functional group and organic group are bonded directly to Si. Examples of the curably reactive functional group include a hydroxyl group, and alkoxy groups having 1 to 5 carbon atoms. Examples of the organic group include a methyl group, an ethyl group, a vinyl group, a haloalkyl group, and a phenyl group.

One or more crosslinking agents, curing catalysts or the like can be added to the organopolysiloxane, if desired.

The above silicone rubber (b) is cured at room temperature or by heating. The specific curing mechanism can vary widely, and can include, for example, hydrolyzation, dealcoholyzation, deacetification, and dehydroxyamination. The use of the organopolysiloxane having a vinyl group makes possible curing by irradiation of electron rays or ultraviolet light. If ultraviolet light is used for the irradiation, it is generally necessary to add a photosensitizer.

The above silicone rubber (b) has a number-average molecular weight which is less than that of silicone rubber (a) and about from 500 to 20,000. The molecular weight of this component is preferably about from 2,000 to 15,000. If the number-average molecular weight of the silicone rubber (b) is either lower than about 500 or higher than about 20,000, it results in a coating film inferior in antifouling durability over a long period of time because it is impossible to make a uniform antifouling functional layer of the silicone oil (c) on a surface of the coated film.

In the present invention, the mixing ratio of the above silicone rubber (a) to the silicone rubber (b) is in the range of about from 5 to 95 parts by weight of each component, based on the combined weights of the two rubbers, and preferably about from 20 to 80 parts by weight, and more preferably about from 30 to 70 parts by weight of the former to about from 5 to 95 parts by weight, as the resin solid content, preferably about from 20 to 80 parts by weight, more preferably about from 30 to 70 parts by weight, of the latter. If the silicone rubber (a) to the silicone rubber (b) is lower than about 5 parts by weight, it results in a coating film inferior in toughness. On the other hand, if the mixing ratio of the silicone rubber (a) to the silicone rubber (b) is higher than about 95 parts by weight, it results in a coating film inferior in antifouling durability over a long period of time because it is impossible to make a uniform antifouling functional layer of the silicone oil (c) on a surface of the coated film.

Silicone Oil (c)

The silicone oil (c) is used in the present invention to make a uniform antifouling functional layer on the aforementioned silicone rubbers (a) and (b), and is not reactive with the silicone rubbers.

As to the silicone oil (c), a wide variety of known silicone oils can be used, alone or in combination. For example, this component can be at least one selected from the silicone oils represented by the following general formulas (I) and (II):

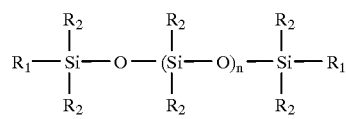
(I)

wherein the $R_1$ moieties are independently selected from a hydrogen atom, alkyl groups having 1 to 10 carbon atoms, an aryl group, and aralkyl or fluoroalkyl groups; the $R_2$ moieties are independently selected from alkyl groups having 1 to 10 carbon atoms, an aryl group, and aralkyl or fluoroalkyl groups; and n is an integer of 0 to 150.

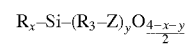
(II)

wherein R represents a hydrogen atom, an alkyl group having 1 to 10 carbon atoms, an aryl group or an aralkyl group; $R_3$ represents a divalent aliphatic hydrocarbon group having 1 to 10 carbon atoms, which may be bonded directly or through an ether group, an ester group or a —NH— group; Z represents a monovalent polar group such as an amino group, a carboxyl group, an epoxy group, a poly (ethylene glycol) or poly(propylene glycol) group which may be blocked by an alkyl or acyl group having 1 to 6 carbon atoms; and x and y are represented respectively as $0.01 < x < 3.99$, $0.01 < y < 3.99$ and $0.02 < x+y < 4$.

In the present invention, it is desirable that the silicone oil (c) is incompatible, to some extent, with the organopolysiloxane which is contained in the silicone rubbers (a) and (b).

In the above general formula (I), it is preferable that R, is a methyl group, a phenyl group, or a hydroxyl group, and $R_2$ is a methyl group, a phenyl group, or 4-trifluorobutyl group.

The silicone oil (c) represented by the above general formula (I) of the present invention can have a number-average molecular weight of about from 180 to 20,000, preferably about from 1,000 to 10,000, and a viscosity of about from 10 to 10,000 centistokes, preferably about from 100 to 5,000 centistokes. When the number-average molecular weight is less than about 180, the resulting film shows poor drying characteristics. On the other hand, when the number-average molecular weight is more than about 20,000, the exudation effect of the silicone oil to the surface is not realized, resulting in poor antifouling properties. When the viscosity of the silicone oil is less than about 10 centistokes, it may exude to the surface, but could not retain itself thereon, thereby making it impossible to obtain the intended antifouling performance. On the other hand, when the viscosity is higher than about 10,000 centistokes, its exudation to the surface becomes impossible, thereby making it impossible to obtain the intended antifouling performance. Typical examples of the above silicone oil include dimethyl silicone oil having hydroxy functionality at one end or both ends of its molecular terminal (either or both of $R_1$ is hydroxy group), dimethyl silicone oil (all of $R_1$ and $R_2$ are methyl groups), phenyl methyl silicone oil and the like.

In the above general formula (II), it is preferable that R is a methyl group or a phenyl group, and $R_3$ is a methylene group, an ethylene group, or a propylene group. Regarding Z, it is preferable that the repeat number of the ethylene glycol or propylene glycol unit is 10 to 60; an alkyl group having 1 to 6 carbon atoms is a methyl group, an ethyl group, a butyl group or the like; and an acyl group having 1 to 6 carbon atoms is an acetyl group, a propionyl group or the like.

The silicone oil (c) represented by the above general formula (II) of the present invention can have a number-average molecular weight of about from 250 to 30,000, preferably about from 1,000 to 20,000, and a viscosity of about from 20 to 50,000 centistokes, preferably about from 100 to 5,000 centistokes. When the number-average molecular weight is less than about 250, the resulting film shows poor drying characteristics. On the other hand, when the number-average molecular weight is more than about 30,000, the exudation effect of the silicone oil to the surface is not realized, resulting in poor antifouling properties. When the viscosity of the silicone oil is less than about 20 centistokes, it may be exuded to the surface, but could not retain itself thereon, thereby making it impossible to obtain the intended antifouling performance. On the other hand, when the viscosity is higher than about 50,000 centistokes, its exudation to the surface becomes impossible, thereby making it impossible to obtain the intended antifouling performance. Typical examples of the amino group-modified silicone oil include SF-8417 (trade name, marketed by Toray Silicone Co., Ltd.), ISI-4700 and ISI-4701 (trade name, all marketed by Toshiba Silicone Co., Ltd.), FZ-3712 and AFL-40 (trade name, all marketed by Japan Unicar Co., Ltd.). Typical examples of the carboxyl group-modified silicone oil include, XI-42-411 (trade name, marketed by Toshiba Silicone Co., Ltd.), SF-8418 (trade name, marketed by Toray Silicone Co., Ltd.), and FXZ-3707 (trade name, marketed by Japan Unicar Co., Ltd.). Typical examples of the epoxy group-modified silicone oil include is SF-8411 (trade name, marketed by Toray Silicone Co., Ltd.), ISI-4730 and XI-42-301 (trade name, all marketed by Toshiba Silicone Co., Ltd.), L-9300 and T-29 (trade name, all marketed by Japan Unicar Co., Ltd.). Typical examples of the poly(ethylene glycol) or poly(propylene glycol) group-modified silicone oil include ISI-4460, ISI-4445 and ISI-4446 (trade name, all marketed by Toshiba Silicone Co., Ltd.), SH-3746, SH-8400, SH-3749 and SH-3700 (trade name, all marketed by Toray Silicone Co., Ltd.), KF-6009 (trade name, marketed by Shin-Etsu Silicone Co., Ltd.).

In the present invention, the silicone oil (c) is used in an amount of about from 20 to 200 parts by weight, preferably about from 50 to 150 parts by weight, per 100 parts by weight of the total solids of the silicone rubbers (a) and (b). If the amount of the silicone oil (c) is less than about 20 parts by weight, the antifouling durability over a long period of time is reduced. On the other hand, when more than about 200 parts by weight is used, the curing properties of the resulting film becomes poor, thereby making it impossible to obtain a coated film which has the satisfactory durability required for the antifouling coated film.

Hydrophobic Fumed Silica (d)

The hydrophobic fumed silica (d) used in the present invention is a fumed silica on which surface is generally treated by dimethylpolysiloxane having hydroxyl functionality and, if necessary, by dimethyldichlorosiloxane, hexamethyldisilazane or cyclic dimethylsiloxane, and is used as an extender pigment to give a thixotropic property to the coating composition.

In the present invention, the hydrophobic fumed silica (d) is used in an amount of about from 5 to 30 parts by weight, preferably about from 10 to 25 parts by weight, per 100 parts by weight of the total solids of the silicone rubbers (a) and (b), thereby making it possible to form a coating film having a dry film thickness of more than 125 micrometers when applied by one-coat. If the amount of the hydrophobic fumed silica (d) is less than about 5 parts by weight, it results in a coating composition having poor thixotropic property. On the other hand, when more than about 30 parts by weight is used, it results in a coating composition having very high viscosity, thereby making it impossible to apply.

The non-toxic antifouling coating composition of the present invention can include, when needed, chlorinated paraffin, solid paraffin, liquid paraffin, Vaseline and the like in an amount of about 10 parts by weight or less, preferably 9 parts by weight or less, per 100 parts by weight of the non-volatile content of the coating composition, and can further include pigments such as extender pigments, color pigments, and corrosion-resistant pigments, organic solvents, plasticizers, anti-sag agents, silane coupling agents, and antifouling agents, depending on the film performance required. For example, a solvent or carrier such as xylene is generally incorporated into the coating compositions of the present invention to facilitate application to the desired substrate. The particular concentration of the solvent or carrier will necessarily vary with the particular formulation and the application method used, and can be adjusted to attain the desired viscosity, as will be evident to those skilled in the art.

The compositions of the present invention can be applied to a substrate by any conventional means, depending on the nature of the substrate to be protected as well as the viscosity and other characteristics of the particular coating composition. Known coating techniques applicable to the present invention include roll-coating, spray coating and dipping.

The present invention makes it possible to provide a non-toxic antifouling coating composition capable of forming a coated film even in a dry film thickness of more than 125 micrometers when applied in a single coat, and shows excellent antifouling properties over a long period of time.

EXAMPLES

The present invention is illustrated in greater detail by the following Examples and Comparative Examples, in which "part" means "part by weight" unless otherwise expressed. The Examples are not to be construed as limiting the scope of the present invention.

For these Examples and Comparative Examples, silicone rubbers and a hydrophobic fumed silica were first uniformly dispersed by a mixer, followed by formulating with crosslinking agents and curing catalysts in the absence of moisture and with uniform mixing. The identities and proportions of the components are summarized in Table 1. In this manner, room temperature-curable organopolysiloxane compositions identified as compositions A to K were obtained.

In Table 1, (*1) silicone rubber (a-1): an organopolysiloxane having a silanol and/or an alkoxysilyl group and a number-average molecular weight of 50,000.

(*2) silicone rubber (a-2): an organopolysiloxane having a silanol and/or an alkoxysilyl group and a number-average molecular weight of 30,000.

(*3) silicone rubber (b-1): an organopolysiloxane having a silanol and/or an alkoxysilyl group and a number-average molecular weight of 3,000.

(*4) silicone rubber (b-2): an organopolysiloxane having a silanol and/or an alkoxysilyl group and a number-average molecular weight of 10,000.

(*5) hydrophobic fumed silica: marketed by Toray Silicone Co., Ltd.

Examples 1 to 5 and Comparative Examples 1 to 7

The preliminary compounds identified in Table 1 were used to prepare non-toxic antifouling coating compositions according to the formulations shown in Table 2.

In Table 2, (*6) KF-6009: trade name, a poly(ethylene glycol) group-modified silicone oil marketed by Shin-Etsu Silicone Co., Ltd.

(*7) KF-50: trade name, a diphenyl silicone oil marketed by Shin-Etsu Silicone Co., Ltd.

(*8) SH-3746: trade name, a poly(ethylene glycol) group-modified silicone oil marketed by Toray Silicone Co., Ltd.

(*9) FZ-3712: trade name, an amino group-modified silicone oil marketed by Japan Unicar Co., Ltd.

(*10) KF-96: trade name, a dimethyl silicone oil marketed by Shin-Etsu Silicone Co., Ltd.

Examples 7 to 10 and Comparative Examples 8 to 12

The preliminary compounds identified in Table 1 were used to prepare non-toxic antifouling coating compositions according to the formulations shown in Table 3.

In Table 3, (*11) SH-510: trade name, a methylphenyl silicone oil marketed by Shin-Etsu Silicone Co., Ltd.

(*12) X-22-4822: trade name, a poly(ethylene glycol) group-modified silicone oil marketed by Shin-Etsu Silicone Co., Ltd.

(*13) T.I. value: The viscosity of the coating composition was measured by Brookfield Viscometer (Rotor #3) at a rotational frequency of 6 and 60 rounds per minutes (rpm) at a temperature of 25° C. The T.I. value (Thixotropic Index value) was calculated from the following equation: T.I. value=Viscosity at 6 rpm/Viscosity at 60 rpm.

(*14) maximum sagging-free film thickness: An epoxy anticorrosive coating composition was coated onto a steel sheet of 1,000 mm×1,000 mm×1 mm to a dry film thickness of 100 micrometers followed by drying for 24 hours at room temperature to obtain a base material. The base material was set vertically. One of the above-prepared coating compositions was airless spray-coated onto the base material by gradient coating so that the dry film thickness of the resulting coating film increased gradually from about 40 to about 250 micrometers. The thus-obtained coated plate was dried for 7 days at room temperature. Then, the resulting plate was observed visually. As a result, the minimum film thickness at which sagging was seen in the coating film of the plate after drying, was taken as the maximum sagging-free film thickness of the coating composition used.

Performance Tests

A zinc epoxy shop primer was coated onto a sand-blasted steel sheet of 100 mm×300 mm×2 mm to a dry film thickness of 15 micrometers, and an epoxy anticorrosive coating composition was coated thereunto to a dry film thickness of 200 micrometers to obtain a coated steel sheet, followed by the antifouling coating compositions obtained in the Examples and Comparative Examples which were coated onto the coated steel sheet by a brush to a dry film thickness of 150 micrometers to obtain coated test sheets. The coated test sheets were dried for 7 days at room temperature, followed by being immersed into seawater in Orito Bay, Shizuoka-ken, Japan for 24 months to evaluate antifouling properties according to the following criteria:

a: No change on the coated surface;

b: Small amount of slime is seen on the coated surface;

c: Small amount of fouling attachment (slime and barnacles) is seen on the coated surface;

d: Medium amount of fouling attachment (slime, barnacles and green algae) is seen on the coated surface;

e: Large amount of fouling attachment (slime, barnacles and green algae) is seen on the coated surface; and f: Detachment of the coating film is seen on the coated surface.

The results are shown in Tables 2 and 3.

TABLE 1

| | | Preliminary Compounding | | | | | | | | | | |
|---|---|---|---|---|---|---|---|---|---|---|---|---|
| Name of organopolysiloxane composition | | A | B | C | D | E | F | G | H | I | J | K |
| Formulation | Room temperature-curable silicone rubber (a) | | | | | | | | | | | |
| | (a-1) (*1) | 20 | | 80 | | 60 | | | 100 | | | |
| | (a-2) (*2) | | 20 | | 70 | | 60 | 50 | | 100 | | |
| | Room temperature-curable silicone rubber (b) | | | | | | | | | | | |
| | (b-1) (*3) | 80 | | 20 | | 40 | 40 | 50 | | | 100 | |
| | (b-2) (*4) | | 80 | | 30 | | | | | | | 100 |
| | Hydrophobic fumed silica (d) (*5) | 20 | 20 | 20 | 20 | 20 | 15 | 3 | 20 | 20 | 20 | 20 |
| | Crosslinking agent | | | | | | | | | | | |
| | Methyl-tris(methyl ethyl ketoxime)silane | 20 | 20 | 20 | | 20 | 10 | 10 | 10 | 10 | 10 | 20 |
| | Methyltriacetoxysilane | | | | 10 | | | | | | | |
| | Curing catalyst | | | | | | | | | | | |
| | Dibutyltin dilaurate | 0.1 | 0.1 | | 0.1 | 0.1 | 0.1 | 0.1 | 0.1 | 0.1 | 0.1 | 0.1 |
| | Tetrabutyl orthotitanate | | | 0.2 | | | | | | | | |
| | Solvent Xylene | 15 | 15 | 15 | 15 | 15 | 15 | 15 | 15 | 15 | 15 | 15 |
| Characteristics | Viscosity (poise/25° C.) | 40 | 45 | 400 | 350 | 300 | 300 | 100 | 450 | 400 | 35 | 35 |
| | Specific gravity (20° C.) | 0.99 | 0.99 | 0.99 | 0.99 | 0.99 | 0.99 | 0.99 | 0.99 | 0.99 | 0.99 | 0.99 |

TABLE 2

| | | | Examples | | | | | Comparative Examples | | | | | | |
|---|---|---|---|---|---|---|---|---|---|---|---|---|---|---|
| | | | 1 | 2 | 3 | 4 | 5 | 1 | 2 | 3 | 4 | 5 | 6 | 7 |
| Formulation | Organopolysiloxane composition | Kind | A | B | C | D | E | H | I | A | H | I | J | K |
| | | Amount (part) | 100 | 100 | 100 | 100 | 100 | 100 | 100 | 100 | 100 | 100 | 100 | 100 |
| | Silicone oil (c) | KF-6009 (*6) | 20 | | | | | 50 | | | | | 20 | 20 |
| | | KF-50 (*7) | | 60 | 50 | | 50 | | | | 50 | 50 | | |
| | | SH-3746 (*8) | | 20 | | 30 | | | | | | | | |
| | | FZ-3712 (*9) | | | 30 | | | | | | 30 | 30 | | |
| | | KF-96 (*10) | 100 | | | 100 | 100 | 150 | 10 | | | | 100 | 100 |
| | Solvent | Xylene | 20 | 20 | 20 | 20 | 10 | 10 | 20 | 20 | 15 | 15 | 10 | 10 |
| Antifouling property | After 6 months | | a | a | a | a | a | a | c | e | a | a | a | a |
| | After 12 months | | a | a | a | a | a | a | d | e | a | a | a | a |
| | After 18 months | | b | b | b | a | a | d | d | e | c | c | c | c |
| | After 24 months | | b | b | b | b | b | f | d | e | d | d | f | d |

TABLE 3

| | | | Examples | | | | | Comparative Examples | | | | |
|---|---|---|---|---|---|---|---|---|---|---|---|---|
| | | | 6 | 7 | 8 | 9 | 10 | 8 | 9 | 10 | 11 | 12 |
| Formulation | Organopolysiloxane composition | Kind | B | C | D | E | F | H | I | J | K | G |
| | | Amount (part) | 100 | 100 | 100 | 100 | 100 | 100 | 100 | 100 | 100 | 100 |
| | Silicone oil (c) | KF-6009 | | 20 | | | | 20 | 20 | | | |
| | | KF-50 | 60 | | 90 | | 50 | | | 60 | 60 | |
| | | SH-3746 | | | | | | | | | | |
| | | FZ-3712 | | | | | | | | | | |
| | | KF-96 | | | | 10 | | | | | | |
| | | SH-510 (*11) | | 50 | | 120 | 50 | 50 | 50 | | | |
| | | X-22-4822 (*12) | 20 | | | | | | | 20 | 20 | |
| | Solvent | Xylene | 20 | 20 | 20 | 20 | 20 | 20 | 20 | 15 | 15 | 20 |
| Characteristics | Viscosity (poise/25° C.) | | 15 | 16 | 5 | 5 | 5.5 | 5 | 4.5 | 6 | 6 | 8 |
| | T.I. Value (*13) | | 3.6 | 3.5 | 2.5 | 2.2 | 3.0 | 1.5 | 1.5 | 1.7 | 1.7 | 1.7 |
| | Specific gravity (20° C.) | | 0.97 | 0.97 | 0.97 | 0.97 | 0.97 | 0.97 | 0.97 | 0.97 | 0.97 | 0.97 |
| | Maximum sagging-free film thickness (μm) (*14) | | 150 | 140 | 140 | 150 | 175 | 80 | 75 | 90 | 90 | 40 |
| Antifouling property | After 6 months | | a | a | a | a | a | a | a | a | a | e |
| | After 12 months | | a | a | a | a | a | a | a | a | a | e |
| | After 18 months | | a | a | a | a | a | c | c | c | c | e |
| | After 24 months | | b | b | b | b | b | d | d | d | d | e |

The experimental data in the Examples and Comparative Examples show the importance of the components of the present compositions. In each of the Comparative Examples, either the short-term or long-term fouling properties are inferior to the coatings of the present invention. This results from the omission, in the Comparative Examples, of one of the required components of the present invention, namely, the high molecular weight rubber, the low molecular weight rubber, or the silicone oil.

We claim:

1. A non-toxic antifouling coating composition comprising:

(a) about from 5 to 95 parts by weight of rubbers (a) and (b) of a room temperature-curable silicone rubber having a number-average molecular weight of about from 20,000 to 100,000;

(b) about from 5 to 95 parts by weight of rubbers (a) and (b) of a room temperature-curable silicone rubber having a number-average molecular weight of about from 500 to 20,000 and less than that of rubber (a);

(c) at least one silicone oil in an amount of about from 20 to 200 parts by weight per 100 parts by weight of rubbers (a) and (b); and (d) hydrophobic fumed silica in an amount of about from 5 to 30 parts by weight per 100 parts by weight of rubbers (a) and (b).

2. A non-toxic antifouling coating composition according to claim 1 wherein the at least one silicone oil is at least one represented by the following general formula (I):

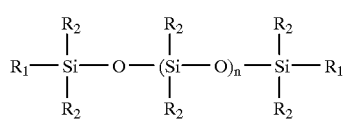

(I)

wherein the $R_1$ moieties are independently selected from a hydrogen atom, alkyl groups having 1 to 10 carbon atoms, an aryl group, and aralkyl or fluoroalkyl groups; the $R_2$ moieties are independently selected from alkyl groups having 1 to 10 carbon atoms, an aryl group, and aralkyl or fluoroalkyl groups; and n is an integer of 0 to 150.

3. A non-toxic antifouling coating composition according to claim 1 wherein the at least one silicone oil is at least one represented by the following general formula (II):

(II)

wherein R represents a hydrogen atom, an alkyl group having 1 to 10 carbon atoms, an aryl group or an aralkyl group; $R_3$ represents a divalent aliphatic hydrocarbon group having 1 to 10 carbon atoms, which may be bonded directly or through an ether group, an ester group or a —NH— group; Z represents a monovalent polar group; and x and y are represented respectively as $0.01<x<3.99$, $0.01<y<3.99$ and $0.02<x+y<4$.

4. A non-toxic antifouling coating composition according to claim 3 wherein the monovalent polar group represented by Z in formula II is at least one selected from the group consisting of amino groups, carboxyl groups, epoxy groups, poly(ethylene glycol) groups which may be blocked by alkyl or acyl groups having 1 to 6 carbon atoms, and poly(propylene glycol) groups which may be blocked by alkyl or acyl groups having 1 to 6 carbon atoms.

5. A metal substrate bearing a cured coating composition of claim 1.

6. A process for improving the anti-fouling properties of a metal substrate comprising applying to the metal substrate a coating composition of claim 1 and curing the coating.

* * * * *